United States Patent
Walsh et al.

(10) Patent No.: US 12,084,041 B2
(45) Date of Patent: Sep. 10, 2024

(54) INTERNAL COMBUSTION ENGINE TORQUE OPTIMIZATION SUBJECT TO CONSTRAINTS IN HYBRID-ELECTRIC POWERTRAINS

(71) Applicants: Mckenzie T Walsh, Ortonville, MI (US); Szabolcs Sovenyi, Bloomfield Hills, MI (US); Nadirsh Patel, Farmington Hills, MI (US)

(72) Inventors: Mckenzie T Walsh, Ortonville, MI (US); Szabolcs Sovenyi, Bloomfield Hills, MI (US); Nadirsh Patel, Farmington Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 368 days.

(21) Appl. No.: 17/526,049

(22) Filed: Nov. 15, 2021

(65) Prior Publication Data

US 2023/0150477 A1    May 18, 2023

(51) Int. Cl.
*B60W 20/17* (2016.01)
*B60W 10/06* (2006.01)
*B60W 10/08* (2006.01)
*B60W 30/182* (2020.01)

(52) U.S. Cl.
CPC ............ *B60W 20/17* (2016.01); *B60W 10/06* (2013.01); *B60W 10/08* (2013.01); *B60W 30/182* (2013.01); *B60W 2510/0657* (2013.01); *B60W 2510/083* (2013.01); *B60W 2720/40* (2013.01)

(58) Field of Classification Search
CPC ...... B60W 20/17; B60W 10/06; B60W 10/08; B60W 30/182; B60W 2510/0657; B60W 2510/083; B60W 2720/40; B60W 30/1882; B60W 20/11; Y02T 10/62
See application file for complete search history.

(56) References Cited

U.S. PATENT DOCUMENTS

| | | |
|---|---|---|
| 7,154,236 B1 | 12/2006 | Heap |
| 8,112,207 B2 | 2/2012 | Heap et al. |
| 8,285,462 B2 | 10/2012 | Heap et al. |
| 8,433,486 B2 | 4/2013 | Heap et al. |
| 8,892,284 B2 | 11/2014 | Diaz et al. |
| 2006/0048988 A1 | 3/2006 | Dreibholz et al. |
| 2009/0118950 A1* | 5/2009 | Heap ................. B60K 6/40 701/55 |
| 2020/0130672 A1* | 4/2020 | Oh .................... B60W 10/06 |
| 2020/0164858 A1* | 5/2020 | Shibaike ............. B60K 6/445 |

* cited by examiner

*Primary Examiner* — Brian P Sweeney
(74) *Attorney, Agent, or Firm* — Jeremy J. Klobucar (57) ABSTRACT

Hybrid-electric powertrain control systems and methods include a set of sensors configured to measure a set of operating parameters of a set of components of the hybrid-electric powertrain that are each a constraint on minimum/maximum motor torque limits for the electric motors thereby collectively forming a set of constraints and a controller configured to perform a linear optimization to find the best engine torque values that are attainable subject to a set of constraint inequalities as defined by current vehicle state and as monitored by the set of sensors, and control the hybrid-electric powertrain based on the best engine torque values to avoid excessive torque commands that could damage physical components of the hybrid-electric powertrain and/or could cause undesirable noise/vibration/harshness (NVH) characteristics.

15 Claims, 7 Drawing Sheets

INTERNAL COMBUSTION ENGINE TORQUE OPTIMIZATION SUBJECT TO CONSTRAINTS IN HYBRID-ELECTRIC POWERTRAINS

FIELD

The present application generally relates to vehicles having hybrid-electric powertrains and, more particularly, to internal combustion engine torque optimization subject to constraints in hybrid-electric powertrains.

BACKGROUND

A vehicle hybrid-electric powertrain typically includes an internal combustion engine and at least one electric motor. In some configurations, a hybrid-electric powertrain could include an engine and two or more electric motors. Various components of the powertrain, e.g., clutches, drive belts, electric motors, etc. offer a limited capacity to transmit torque. A physics-based analysis determines the inequalities that link the minimum and maximum torque limits of mechanical components to the motor and engine torque levels. If the physics-based analysis shows that a constrained variable (e.g., clutch torque) depends on the torque levels of both electric motors, then this is referred to as "sloped constraints," with the horizontal constraints only depending on the torque level of one of the electric motors and vertical constraints only depending on the torque level of the other electric motor. In contrast, if the constrained variable were not sloped, it would depend on only one electric motor torque level, and thus there would be fewer variables to solve for when the constraints and minimum and maximum values are calculated. The challenge of working with sloped constraints is that they lead to more complex constraint equations to solve. Some of these equations, or even systems of equations, are so complex, that a vehicle controller could lack the processor execution speed and memory to handle them with the required update frequency. Accordingly, while such conventional hybrid-electric powertrain control systems do work for their intended purpose, there exists an opportunity for improvement in the relevant art.

SUMMARY

According to one example aspect of the present invention, a control system for a hybrid-electric powertrain of a vehicle, the hybrid-electric powertrain including an internal combustion engine, two electric motors, a battery system, and an optional transmission comprising a plurality of clutches, is presented. In one exemplary implementation, the control system comprises a set of sensors configured to measure a set of operating parameters of a set of components of the hybrid-electric powertrain, wherein each component of the set of components is a constraint on minimum/maximum motor torque limits for the electric motors thereby collectively forming a set of constraints, and a controller configured to perform a linear optimization to find the best engine torque values that are attainable subject to a set of constraint inequalities as defined by current vehicle state and as monitored by the set of sensors, and control the hybrid-electric powertrain based on the best engine torque values to avoid excessive torque commands that could damage physical components of the hybrid-electric powertrain and/or could cause undesirable noise/vibration/harshness (NVH) characteristics.

In some implementations, there is a plurality of constraints depending on a configuration of the hybrid-electric powertrain and operation mode. In some implementations, the plurality of constraints includes at least two of engine torque, drive belt slip torque, torque of the electric motors, clutch and/or transmission gear states, and a state of the battery system. In some implementations, the operation mode includes at least one of whether the engine participates in a series hybrid operating mode or a parallel hybrid operating mode, electric motor generator or motor mode, battery system depletion, charge sustaining, or recharging modes, clutch pack slippage, disengaged/open, or lock operation, dog clutch engaged or disengaged operation, and transmission gear selection.

In some implementations, the controller is configured to take two constraint plane pairs at a time and determine the intersections between them and the motor torque minimum/maximum limits for all currently active constraint plane pair combinations, and then the best engine torque levels are chosen. In some implementations, the controller first determines four intersection lines between the two pairs of constraint planes and then finds the intersection points of these lines with the planes of the motor minimum/maximum torque levels with a three-dimensional geometric approach.

In some implementations, the controller determines the intersection points of two of the constraint plane pairs with the slab, and then the best engine torque levels are chosen. In some implementations, the controller is configured to first find the four vertical edges of the motor minimum/maximum torque slab and then find the intersection points of two constraint plane pairs at a time with the four vertical edges leading to at most sixteen intersection points.

In some implementations, the controller is configured to take two constraint plane pairs at a time and determine the intersections between them and the motor torque minimum/maximum limits for all currently active constraint plane pair combinations and determine the intersection points of two of the constraint plane pairs with the slab, and then the best engine torque levels are chosen. In some implementations, the controller determines four intersection lines between the two pairs of constraint planes and then finds the intersection points of these lines with the planes of the motor minimum/maximum torque levels with a three-dimensional geometric approach, and finds the four vertical edges of the motor minimum/maximum torque slab and then finds the intersection points of two constraint plane pairs at a time with the four vertical edges leading to at most sixteen intersection points.

According to another example aspect of the invention, a method for controlling for a hybrid-electric powertrain of a vehicle, the hybrid-electric powertrain including an internal combustion engine, two electric motors, a battery system, and an optional transmission comprising a plurality of clutches, is presented. In one exemplary implementation, the method comprises receiving, by a controller of the vehicle and from a set of sensors of the hybrid-electric powertrain, a set of operating parameters of a set of components of the hybrid-electric powertrain, wherein each component of the set of components is a constraint on minimum/maximum motor torque limits for the electric motors thereby collectively forming a set of constraints, performing, by the controller, a linear optimization to find the best engine torque values that are attainable subject to a set of constraint inequalities as defined by current vehicle state and as monitored by the set of sensors, and controlling, by the controller, the hybrid-electric powertrain based on the best engine torque values to avoid excessive torque commands that could damage physical components of the hybrid-electric powertrain and/or could cause undesirable noise/vibration/harshness (NVH) characteristics.

In some implementations, there is a plurality of constraints depending on a configuration of the hybrid-electric powertrain and operation mode. In some implementations, the plurality of constraints includes at least two of engine torque, drive belt slip torque, torque of the electric motors, clutch and/or transmission gear states, and a state of the battery system. In some implementations, the operation mode includes at least one of whether the engine participates in a series hybrid operating mode or a parallel hybrid operating mode, electric motor generator or motor mode, battery system depletion, charge sustaining, or recharging mode, clutch pack slippage, disengaged/open, or lock operation, dog clutch engaged or disengaged operation, and transmission gear selection.

In some implementations, the controller is configured to take two constraint plane pairs at a time and determine the intersections between them and the motor torque minimum/maximum limits for all currently active constraint plane pair combinations, and then the best engine torque levels are chosen. In some implementations, the controller first determines four intersection lines between the two pairs of constraint planes and then finds the intersection points of these lines with the planes of the motor minimum/maximum torque levels with a three-dimensional geometric approach.

In some implementations, the controller determines the intersection points of two of the constraint plane pairs with the slab, and then the best engine torque levels are chosen. In some implementations, the controller is configured to first find the four vertical edges of the motor minimum/maximum torque slab and then find the intersection points of two constraint plane pairs at a time with the four vertical edges leading to at most sixteen intersection points.

In some implementations, the controller is configured to take two constraint plane pairs at a time and determine the intersections between them and the motor torque minimum/maximum limits for all currently active constraint plane pair combinations and determine the intersection points of two of the constraint plane pairs with the slab, and then the best engine torque levels are chosen. In some implementations, the controller determines four intersection lines between the two pairs of constraint planes and then finds the intersection points of these lines with the planes of the motor minimum/maximum torque levels with a three-dimensional geometric approach, and finds the four vertical edges of the motor minimum/maximum torque slab and then finds the intersection points of two constraint plane pairs at a time with the four vertical edges leading to at most sixteen intersection points.

Further areas of applicability of the teachings of the present application will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present application are intended to be within the scope of the present application.

DESCRIPTION

As discussed above, a specific hybrid-electric powertrain configuration having an internal combustion engine, two electric motors, and a transmission comprising a plurality of clutches. The primary challenge in working with a set of constraints that depend on one or both motor torque levels and the engine torque level is that they lead to more complex constraint equations to solve, e.g., due to different powertrain operation modes: series or parallel hybrid operating modes, electric motor generator or motor mode, battery system charging, discharging, or charge sustaining mode, and clutch pack slipping, locked or disengaged operation, dog clutch engaged or disengaged operation, transmission gear selection. Some constraint equations could be so complex that existing processors could lack the speed and/or memory to solve them within the update frequency required, which could result in the requirement of a more expensive and more powerful processor. As a result, improved control systems and methods for this configuration of hybrid-electric powertrain are presented. These control systems and methods are capable of solving three-dimensional constraint equations in a unique and novel manner that does not require additional processor speed/memory.

Figure 1:
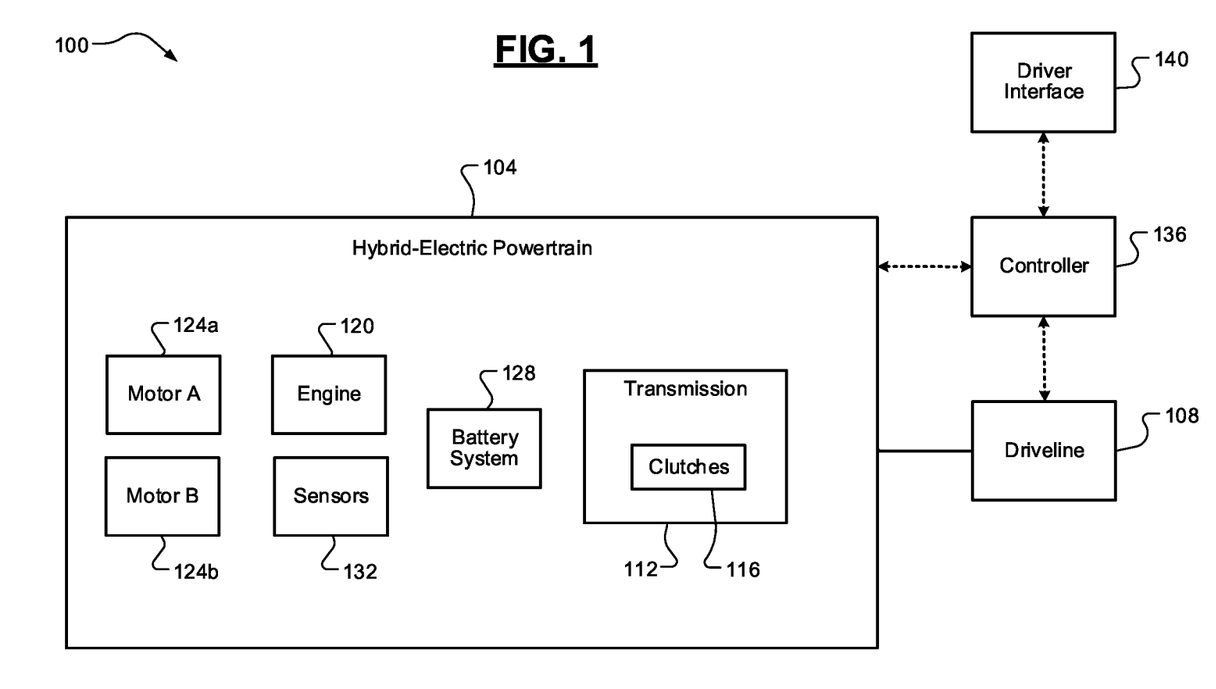
FIG. 1 is a functional block diagram of a vehicle having an example hybrid-electric powertrain according to the principles of the present application.

Referring now to FIG. 1, a functional block diagram of a vehicle 100 having an example hybrid-electric powertrain 104 according to the principles of the present application is illustrated. The hybrid-electric powertrain 104 is configured to generate drive torque for vehicle propulsion or regenerative braking torque at a driveline 108. The hybrid-electric powertrain 104 generally comprises an optional transmission 112 comprising a plurality of clutches 116, an internal combustion engine 120, two electric motors 124a, 124b, a battery system 128, and a set of one or more sensors 132. Non-limiting examples of the sensor(s) include clutch hydraulic pressure sensor(s), transmission gear state sensor(s), shaft speed sensors, and battery system state sensor(s). While the electric motors 124a, 124b are shown separately from the transmission 112, it will be appreciated that the transmission 112 could be a hybrid transmission that includes one or both of the electric motors 124a, 124b. A controller 136 controls operation of the hybrid-electric powertrain 104, such as to achieve or generate a desired amount of drive torque or regenerative braking torque based on driver input or torque request via a driver interface 140.

Figure 2:
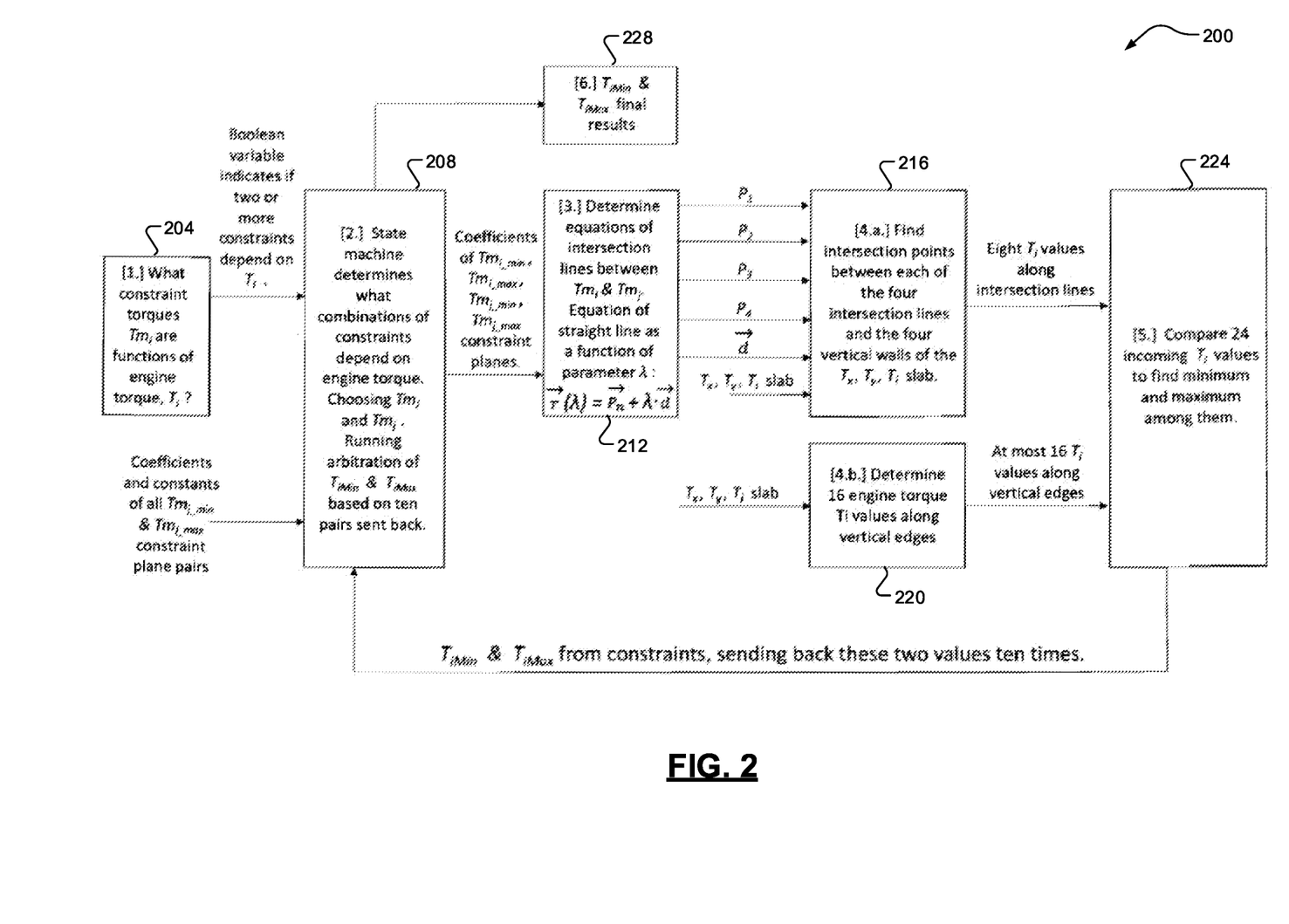
FIG. 2 is a functional block diagram of an example minimum/maximum torque limit determination architecture according to the principles of the present application.

Referring now to FIG. 2, a functional block diagram of an example minimum/maximum engine torque level determination architecture 200 according to the principles of the present application is illustrated. The torques of the electric motors 124a, 124b (also referred to as "motor A" and "motor B," respectively) and the engine 120 are considered to be independent variables when describing the hybrid-electric powertrain 104: $T_a$=torque of motor A 124a, $T_b$=torque of motor B 124b, and $T_i$=torque of engine 120 (e.g., all in Newton-meters, or Nm). The mathematical modeling of some of the hybrid-electric powertrain components becomes more straightforward and uniform across different vehicle powertrain architectures if a coordinate transformation is applied to motor A and motor B torques according to the following equations:

$$Tx = A_1 * T_a + A_2 \quad (1)$$

$$Ty = B_1 * T_b + B_2 \quad (2),$$

where $A_1$, $B_1$, $A_2$, and $B_2$ are known scalars, Tx ($\sqrt{W}$) represents transformed motor A torque, and Ty ($\sqrt{W}$) represents transformed motor B torque. This coordinate transformation, however, is not a key aspect of the present application. A linear objective function $Tm_1$ is described in the following equation:

$$f_{objective}(Tx, Ty, Ti) = Tm_1 = k_{Tx,o} * Tx + k_{Ty,o} * Ty + k_{Ti,o} * Ti + D \quad (3)$$

where $Tm_1$ is to be optimized, $k_{Tx,o}$, $k_{Ty,o}$, and $K_{Ti,o}$ are known scalar coefficients, and D is a known scalar constant. Optimization in this context means finding the minimum or maximum (or both) values of $Tm_1$ while honoring the constraint inequalities. The objective function $Tm_1$ can be powertrain output torque or the angular acceleration of some component in the powertrain, and so on, depending on the driving situation and powertrain architecture.

Figure 3:
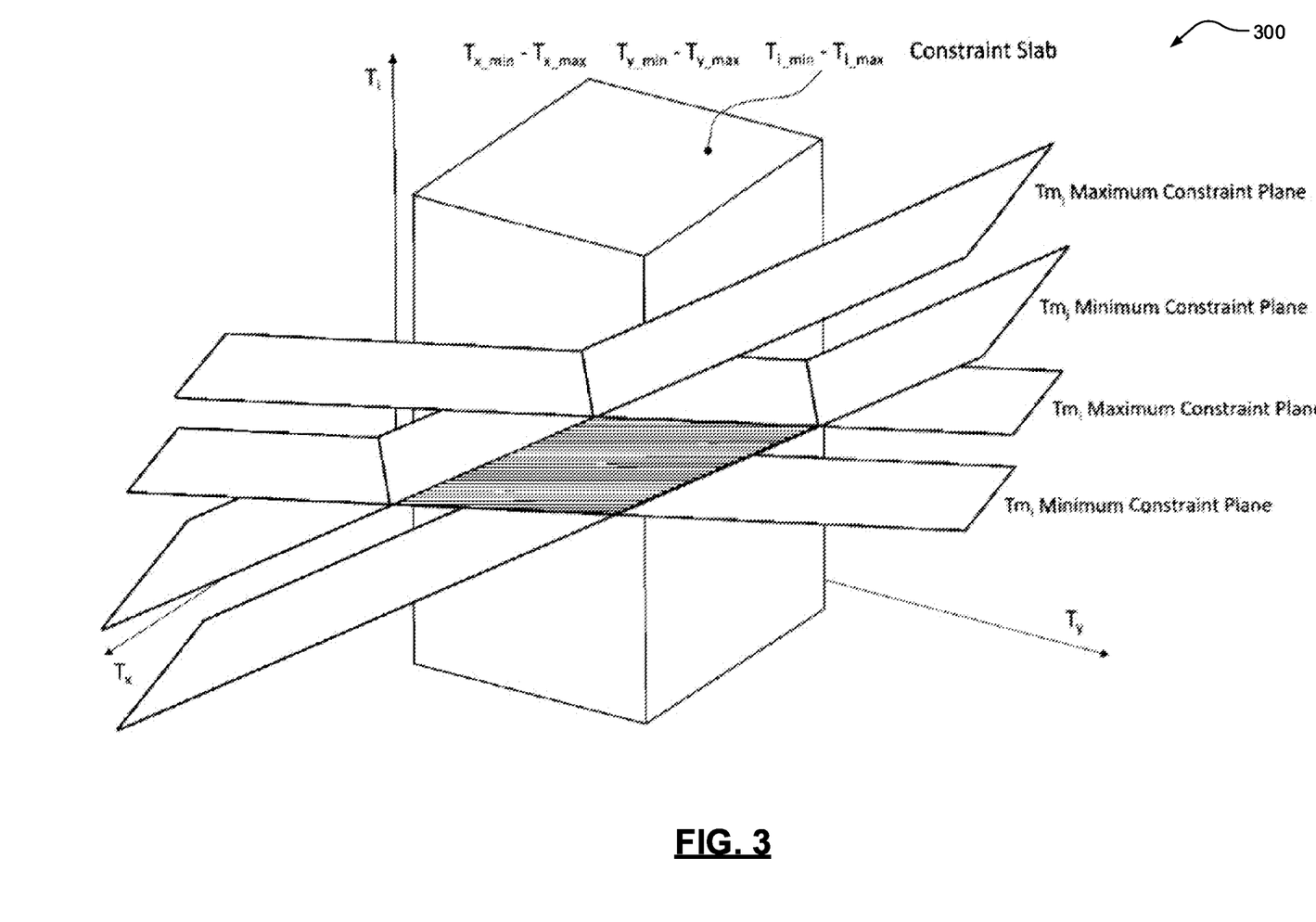
FIG. 3 is an example three-dimensional graph illustrating hybrid-electric powertrain system constraints according to the principles of the present application.

The $k_{Tx,o}$, $k_{Ty,o}$, $K_{Ti,o}$ and D values are calculated based on differential equations of motion of the hybrid-electric powertrain 104 written out for a specific operation mode, clutch configuration, and gear configuration. Optimization in this context means finding the minimum or maximum value of $Tm_1$ as a function of Tx, Ty, and Ti. The search for the minimum or maximum value of $Tm_1$ starts within a slab-shaped domain (see FIG. 3) determined by other software routines upstream from these routines of the present application. Three minimum/maximum inequality constraints forming the slab in three-dimensions are defined by Tx (motor A torque) and Ty (motor B torque) and Ti engine torque minimum/maximum inequality constraints as described below. These minimum/maximum inequality constraints incorporate motor torque capabilities.

$$Tx_{min} \leq T \leq TX_{max} \quad (4)$$

$$Ty_{min} \leq Ty \leq Ty_{max} \quad (5)$$

$$Ti_{min} \leq Ti \leq Ti_{max} \quad (6).$$

After the $Tx_{min}$, $Tx_{max}$, $Ty_{min}$, $Ty_{max}$, $Ti_{min}$, and $Ti_{max}$ limits of the slab are calculated, a plurality of, for instance five linear minimum/maximum inequality constraints are imposed. These are denoted $Tm_2$ through $Tm_6$.

Each of the $Tm_2$ through $Tm_6$ constraints are described generally in the following pair of inequalities where n=2, . . . , 6.

$$Tm_{min,n} \leq k_{Tx,n} * Tx + k_{Ty,n} * Ty + k_{Ti,n} * Ti + M_n \leq Tm_{max,n} \quad (7).$$

The following scalar coefficients $k_{Tx,n}$, $k_{Ty,n}$, and $k_{Ti,n}$ and constant scalar term $M_n$ are determined based on the differential equations of motion of the powertrain and some powertrain parameters, such as damping, inertia, and gear ratio values. $Tm_{min,n}$ and $Tm_{max,n}$ are known minimum/maximum values for the $n^{th}$ constraint. Additionally, the $n^{th}$ minimum inequality constraint plane is parallel to the $n^{th}$ maximum inequality constraint plane and the minimum/maximum constraints are imposed together as minimum/maximum sets. The $Tm_2$ through $Tm_6$ linear constraints each limit the space available for the minimum or maximum point. From a geometric standpoint, these constraint planes (see FIGS. 3-4) each may cut across the slab and leave a smaller domain available for searching for the maximum or minimum point. Descending priority is assigned to each minimum/maximum constraint, with constraint $Tm_2$ having the highest priority and constraint $Tm_6$ having the lowest priority.

If two or more constraint inequalities contradict one another, then the constraint inequality with the higher priority will be considered. More specifically, if, for instance, a domain (e.g., domain 3) is already constrained by $Tm_2$ and $Tm_3$, and no part of domain 3 satisfies $Tm_4$, then, within domain 3, the geometric feature that falls the closest to the $Tm_4$ planes will be chosen as the result of applying $Tm_4$. If the planes of $Tm_4$ are parallel with the closest plane of domain 3, then that plane of domain 3 will be selected as domain 4. If domain 3 has a straight edge that runs parallel with the $Tm_4$ planes, and is the closest domain 3 geometric feature to $Tm_4$, then that straight edge will be selected as domain 4. If the domain 3 feature falling the closest to the planes of $Tm_4$ is a point, then that point will become domain 4. Imposing the $Tm_2$ through $Tm_6$ constraints on the $Tx_{min}$, $Ty_{max}$, $Ty_{min}$, $Ty_{max}$, $Ti_{min}$, and $Ti_{max}$ slab and finding the $Ti_{min}$ and $Ti_{max}$ values under those constraints is a key objective of the present application.

A summary of the hybrid-electric powertrain constraints can be seen in Table 1 below:

TABLE 1

| Constraint Description | Constraint Type | Constraint Expression |
| --- | --- | --- |
| Tx Min | Slab, Tx min/max set | $Tx_{min} \leq Tx$ |
| Tx Max | Slab, Tx min/max set | $Tx \leq Tx_{max}$ |
| Ty Min | Slab, Ty min/max set | $Ty_{min} \leq Ty$ |
| Ty Max | Slab, Ty min/max set | $Ty \leq Ty_{max}$ |
| Ti Min | Slab, Ti min/max set | $Ti_{min} \leq Ti$ |
| Ti Max | Slab, Ti min/max set | $Ti \leq Ti_{max}$ |
| n = 2, Min | $Tm_2$ min plane, part of the $Tm_2$ min, $Tm_2$ max plane pair | $Tm_{min,2} \leq k_{Tx,2} * Tx + k_{Ty,2} * Ty + k_{Ti,2} * Ti + M_2$ |
| n = 2, Max | $Tm_2$ max plane, part of the $Tm_2$ min, $Tm_2$ max plane pair | $k_{Tx,2} * Tx + k_{Ty,2} * Ty + k_{Ti,2} * Ti + M_2 \leq Tm_{max,2}$ |
| n = 3, Min | $Tm_3$ min plane, part of the $Tm_3$ min, $Tm_3$ max plane pair | $Tm_{min,3} \leq k_{Tx,3} * Tx + k_{Ty,3} * Ty + k_{Ti,3} * Ti + M_3$ |
| n = 3, Max | $Tm_3$ max plane, part of the $Tm_3$ min, $Tm_3$ max plane pair | $k_{Tx,3} * Tx + k_{Ty,3} * Ty + k_{Ti,3} * Ti + M_3 \leq Tm_{max,3}$ |
| n = 4, Min | $Tm_4$ min plane, part of the $Tm_4$ min, $Tm_4$ max plane pair | $Tm_{min,4} \leq k_{Tx,4} * Tx + k_{Ty,4} * Ty + k_{Ti,4} * Ti + M_4$ |
| n = 4, Max | $Tm_4$ max plane, part of the $Tm_4$ min, $Tm_4$ max plane pair | $k_{Tx,4} * Tx + k_{Ty,4} * Ty + k_{Ti,4} * Ti + M_4 \leq Tm_{max,4}$ |
| n = 5, Min | $Tm_5$ min plane, part of the $Tm_5$ min, $Tm_5$ max plane pair | $Tm_{min,5} \leq k_{Tx,5} * Tx + k_{Ty,5} * Ty + k_{Ti,5} * Ti + M_5$ |
| n = 5, Max | $Tm_5$ max plane, part of the $Tm_5$ min, $Tm_5$ max plane pair | $k_{Tx,5} * Tx + k_{Ty,5} * Ty + k_{Ti,5} * Ti + M_2 \leq Tm_{max,5}$ |

TABLE 1-continued

| Constraint Description | Constraint Type | Constraint Expression |
| --- | --- | --- |
| n = 6, Min | $Tm_6$ min plane, part of the $Tm_6$ min, $Tm_6$ max plane pair | $Tm_{min,6} \leq k_{Tx,6}*Tx + k_{Ty,6}*Ty + k_{Ti,6}*Ti + M_6$ |
| n = 6, Max | $Tm_6$ max plane, part of the $Tm_6$ min, $Tm_6$ max plane pair | $k_{Tx,6}*Tx + k_{Ty,6}*Ty + k_{Ti,6}*Ti + M_6 \leq Tm_{max,6}$ |

The hybrid-electric powertrain constraints described in Table 1 and the linear objective function $Tm_1$ give rise to a three-dimensional optimization problem. As shown in FIG. 3, this includes hybrid-electric powertrain minimum/maximum linear inequality constraint planes, Tx and Ty electric motor torque inequality constraints, and Ti engine torque minimum/maximum constraints. In FIG. 3, the hatched, parallelogram-shaped cross-section between the $Tm_i$, $Tm_j$ constraint planes indicates the overlap of the $Tm_i$, $Tm_j$ constraints. This is an infinitely long bar that has the indicated parallelogram-shaped cross-section. The overlap bar extends behind the plane of FIG. 3 and also protrudes out of it, towards the viewer. The [Tx, Ty, Ti] operating points inside the bar satisfy both the $Tm_i$ and the $Tm_j$ constraint pairs, a total of four constraint planes. The determination of a Tx and Ty value that satisfies the above-described hybrid-electric powertrain constraints is performed by an already existing software routine, outside of the scope of the present application. The present application is instead systems and methods to determine a Ti value that satisfies all above-described hybrid-electric powertrain constraints and achieve its minimum or maximum value within those constraints.

Figure 4:
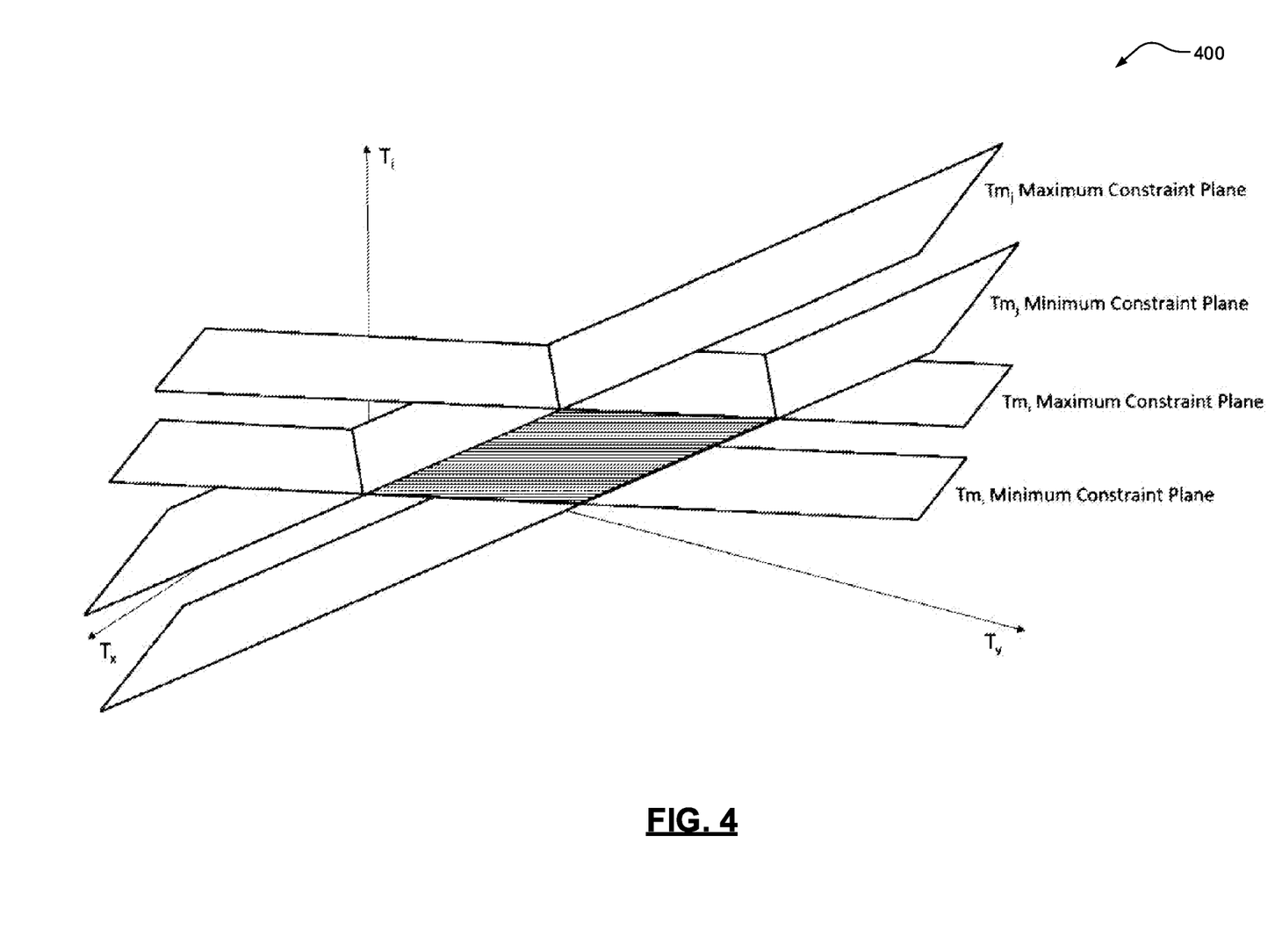
FIG. 4 is an example three-dimensional graph illustrating pairs of minimum/maximum linear inequality constraints according to the principles of the present application.

As discussed in some detail above, the above-described three-dimensional optimization problem is characterized by a plurality of minimum/maximum linear inequality constraints (equation 7), electric motor torque Tx and Ty minimum/maximum inequality constraints (equations 4-5), and engine torque Ti minimum/maximum inequality constraints (equation 6). The proposed technique used to determine a satisfactory minimum/maximum engine torque Ti is executed by analyzing pairs of minimum/maximum linear inequality constraints giving consideration to priority as previously described herein and as shown in FIG. 4. The minimum/maximum linear inequality constraint of a higher priority is referred to as constraint $Tm_1$. The hybrid-electric powertrain 104 shown in FIG. 1 and specifically described herein gives rise to the novel problem of analyzing the following pairs of minimum/maximum linear inequality constraints in three dimensions: (1) one constraint depends on Tx and Ti and the other depends on Ty and Ti, (2) one constraint depends on Tx, Ty, and Ti and the other depends on Tx and Ti, (3) one constraint depends on Tx, Ty, and Ti and the other depends on Ty and Ti, and (4) both constraints depend on Tx, Ty, and Ti. Scenarios when both constraints depend only on Tx and on Ti or when both constraints depend only on Ty and on Ti are managed by already-existing software routines. Those routines are outside of the scope of the present application. Scenarios when only one or no constraint depends on Ti are also handled in other software routines that are also outside of the scope of the present application. According to linear programming theory, on a domain constrained by linear constraints, a linear objective function will reach its minimum or maximum value in a point where at least three constraint planes intersect. The proposed technique for finding this point will now be discussed in greater detail. While there are a multitude of, for instance five constraint plane pairs, they will be analyzed only two at a time, thereby saving on processor throughput and memory. The Tm and $Tm_1$ constraints are selected in block 208 of FIG. 2 from a set of constraints determined at block 204. Each possible combinations of constraint plane pairs are selected and analyzed. The order of execution of these pairwise analyses is irrelevant. After all pairs are analyzed in block 224 (comparison of at most 24 Ti values for minimum/maximum), the results will be synthesized in block 208 (also referred to as "running arbitration") and the final results for TiMin and TiMax are sent out in block 228 for use in controlling the hybrid-electric powertrain 204.

Figure 5:
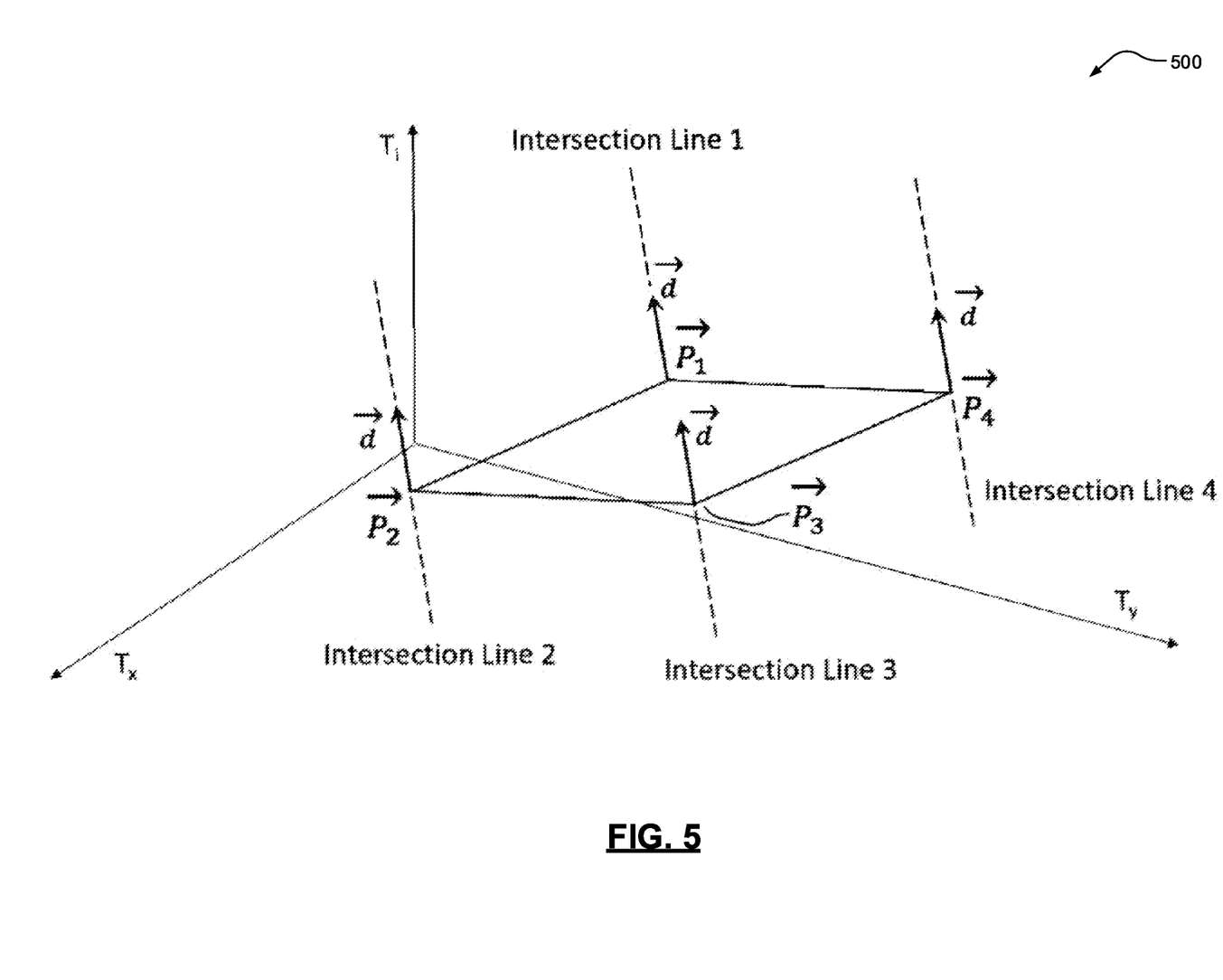
FIG. 5 is an example three-dimensional graph illustrating four intersecting lines of two constraint plane pairs according to the principles of the present application.

According to the proposed technique, first the TiMin, TiMax constraint is removed. From here on, it is assumed that the Tx, Ty, Ti constraint slab is infinitely tall and deep in the Ti direction. On this extended domain, all intersection points will be identified and logged. There are two types of intersection points. For the first type of intersection point, the location of the points where the constraint plane intersection lines poke into and out of the constraint slab is determined at blocks 212 and 216 of FIG. 2. The two pairs of constraint planes have up to four intersection lines, which can be seen in FIG. 5. The parameters of the intersection lines are determined in block 212. The points where each of the four intersection lines enter and exit the slab will be located. Each of the four lines can have at most two such points on it, so this can yield a maximum of eight points, which are found in block 216. This process will now be described in greater detail.

These points can lie along the line formed by the intersection of two constraint planes or intersections of constraint planes and the slab formed by the Tx, Ty, and Ti inequality constraints. First, the four lines formed by intersections of the constraint planes must be computed. The following equations describe the four constraint planes:

$$k_{Tx,i}(Tx)+K_{Ty,i}(Ty)+K_{Ti,i}(Ti)+M_i \geq Tm_{min,i}$$

$$k_{Tx,j}(Tx)+K_{Ty,j}(Ty)+K_{Ti,j}(Ti)+M_j \geq Tm_{min,j}$$

$$k_{Tx,i}(Tx)+K_{Ty,i}(Ty)+K_{Ti,i}(Ti)+M_i \leq Tm_{max,i}$$

$$k_{Tx,j}(Tx)+K_{Ty,j}(Ty)+K_{Ti,j}(Ti)+M_j \leq Tm_{max,j}.$$

The $M_i$ and $M_j$ variables are scalar constants, and so are the $Tm_{min,i}$, $Tm_{min,j}$, $Tm_{max,i}$, and $Tm_{max,j}$ values. Thus, scalar constants $Q_{min,i}$, $Q_{min,j}$, $Q_{max,i}$, and $Q_{max,j}$ can be defined as follows:

$$Q_{min,i}=Tm_{min,i}-M_i$$

$$Q_{min,j}=Tm_{min,j}-M_j$$

$$Q_{max,i}=Tm_{max,i}-M_i$$

$$Q_{max,j}=Tm_{max,j}-M_j.$$

Thus, the four constraint planes can be expressed generally as the following intermediate equations:

$$k_{Tx,i}(Tx)+K_{Ty,i}(Ty)+K_{Ti,i}(Ti) \geq Q_{min,i} \quad (8a)$$

$$k_{Tx,j}(Tx)+K_{Ty,j}(Ty)+K_{Ti,j}(Ti) \geq Q_{min,j} \quad (8b)$$

$$k_{Tx,i}(Tx)+K_{Ty,i}(Ty)+K_{Ti,i}(Ti) \leq Q_{max,i} \quad (9a)$$

$$k_{Tx,j}(Ty)+K_{Ty,j}(Ty)+K_{Ti,j}(Ti) \leq Q_{max,i}. \quad (9b)$$

Since minimum inequality constraint plane i is parallel to the maximum inequality constraint plane i and minimum inequality constraint plane j is parallel to the maximum inequality constraint plane j, intersections are only found between the i and j planes and not the i and i or j and j planes. The procedure described below provides a technique to find one intersection line and is eventually expanded to four intersection lines (see FIGS. 4-5).

A line formed by the intersection of two linear inequality constraint planes is expressed generally in the following equation:

$$\vec{r}(\lambda) = P_0 + \lambda \vec{d} \tag{10}$$

where $\lambda$ is an introduced scalar parameter, $P_0 = (Tx_0, Ty_0, Ti_0)$ is a point that lies on both linear inequality constraint planes, and $\vec{d} = \vec{N}_{Tm,i} \times \vec{N}_{Tm,j}$ is the direction vector of the line of intersection, $\vec{N}_{Tm,i} = (k_{Tx,i}, k_{Ty,i}, k_{Ti,i})$ and $\vec{N}_{Tm,j} = (k_{Tx,j}, k_{Ty,j}, k_{Ti,j})$ are the normal vectors to the linear inequality constraint planes. The cross-product of the two normal vectors is the direction vector of the intersection line. Because there are two pairs of parallel planes, the four direction vectors of the four lines will be parallel. It is sufficient to calculate only one of them. $P_0$ is an arbitrary point along the line. To find $P_0$, consider that the intersection line will cross at least two of the following three planes: Tx=0, Ty=0, and Ti=0. $P_0$ can be found by setting one of the three variables (Tx, Ty, or Ti) to be zero and solving the system of two linear equations for the other two remaining variables. The selection of which of the three variables that is set to zero depends on the direction of the intersection line. If the line is known to intersect the Tx=0 plane, then solve the equations for a $P_0$ point on the Tx=0 plane. If the line is known to intersect the Ty=0 plane, then solve the equations for Ty=0. If the line is known to intersect the Ti=0 plane, then solve the equations for Ti=0. Every line intersects a combination of two or all three of these planes, so in every case it will be possible to choose one plane and solve for $P_0$ on that plane.

In the following equations, for instance, $Ty_0=0$ was chosen. To find a point $P_{0,i\_min,j\_max}$ along the intersection line of the $Tm_{i,min}$ and $Tm_{j,max}$ constraint planes, the following equations must be solved:

$$\begin{bmatrix} k_{Tx,i} & k_{Ti,i} \\ k_{Tx,j} & k_{Ti,j} \end{bmatrix} \begin{bmatrix} Tx_{@Ty=0} \\ Ti_{@Ty=0} \end{bmatrix} = \begin{bmatrix} Q_{i,min} \\ Q_{j,max} \end{bmatrix} \tag{11a}$$

$$\begin{bmatrix} Tx_{@Ty=0} \\ Ti_{@Ty=0} \end{bmatrix} = \begin{bmatrix} k_{Tx,i} & k_{Ti,i} \\ k_{Tx,j} & k_{Ti,j} \end{bmatrix}^{-1} \begin{bmatrix} Q_{i,min} \\ Q_{j,max} \end{bmatrix} \tag{11b}$$

$$Tx_0 = \frac{(Q_{i,min})(k_{Ti,j}) - (Q_{j,max})(k_{Ti,i})}{(k_{Tx,i})(k_{Ti,j}) - (k_{Ti,i})(k_{Tx,j})} \tag{12}$$

$$Ty_0 = 0$$

$$Ti_0 = \frac{-(Q_{i,min})(k_{Tx,j}) + (Q_{j,max})(k_{Tx,i})}{(k_{Tx,i})(k_{Ti,j}) - (k_{Ti,i})(k_{Tx,j})}$$

The equations above determine the coordinates $Tx_0$, $Ty_0$, $Ti_0$ of the point $P_{0,i\_min,j\_max}$. The coordinates of the point $P_{0,i\_min,j\_min}$ along the intersection line of $Tm_1$,min and $Tm_1$,min and the point $P_{0,i\_max,j\_max}$ along the intersection line of $Tm_{i\_max}$ and $Tm_{j\_max}$ and $P_{0,i\_max,j\_min}$ along the intersection of $Tm_{i\_max}$ and $Tm_{j\_min}$ can be calculated similarly. These procedures take place in block 212 of FIG. 2. An analogous procedure can be followed if the starting assumption is Tx=0 or Ti=0.

Generally, the line of intersection between two minimum/maximum linear inequality constraint planes is shown in the following equation:

$$\vec{r}(\lambda) = P_0 + \lambda \vec{d} = (Tx_0 + \lambda d_{Tx}, Ty_0 + \lambda d_{Ty}, Ti_0 + \lambda d_{Ti}) \tag{13}$$

where $Ty_0=0$ and the parameter $\lambda$ can be found by setting the Tx and Ty components of the line described in the equations below equal to the extreme values of the inequality constraints described in equations 4-6 that make up the slab in three dimensions. These $\lambda$ values will eventually be used to compute Ti at these points, as shown in the equations below:

$$TxMin = Tx_0 + \lambda_{TxMin} \cdot d_{Tx} \tag{14a}$$

$$\lambda_{TxMin} = \frac{TxMin - Tx_0}{d_{Tx}} \tag{14b}$$

$$TxMax = Tx_0 + \lambda_{TxMax} \cdot d_{Tx}$$

$$\lambda_{TxMax} = \frac{TxMax - Tx_0}{d_{Tx}}$$

where $\lambda_{TxMin}$ corresponds to the point where one of the four constraint intersection lines pokes through the $Tx=Tx_{Min}$ plane on the constraint slab and $\lambda_{TxMax}$ corresponds to the point where one of the four constraint intersection lines pokes through the $Tx=Tx_{Max}$ plane on the constraint slab. Continuing the same logic for the remaining two planes of the slab:

$$TyMin = Ty_0 + \lambda_{TyMin} \cdot d_{Ty}$$

$P_0$ can be solved for on the Ty=0 plane in the present example. $Ty_0=0$ is the Ty coordinate of the $P_0$ point used to create the equation of this intersection line, so:

$$TyMin = \lambda_{TyMin} \cdot d_{Ty} \tag{14c}$$

$$\lambda_{TyMin} = \frac{TyMin}{d_{Ty}}.$$

Similarly:

$$\lambda_{TyMax} = \frac{TyMax}{d_{Ty}}. \tag{14d}$$

After the $\lambda_{TxMin}$, $\lambda_{TxMax}$, $\lambda_{TyMin}$, and $\lambda_{TyMax}$ values are found, equation 13 is used to determine the four Ti values for one of the intersection lines. After finding the points, each must be checked against the slab constraints described in equations 4-6. The following inequality verifies if an intersection point on the $Ty=Ty_{Min}$ plane satisfies the $Tx_{Min}$ and $Tx_{Max}$ constraints:

$$TxMin \leq Tx_0 + \lambda_{TyMin} \cdot d_{Tx} \leq TxMax \tag{15a}$$

Similarly, the following inequality verifies if an intersection point on the $Ty=Ty_{Max}$ plane satisfies the $Tx_{Min}$ and $Tx_{Max}$ constraints:

$$TxMin \leq Tx_0 + \lambda_{TyMax} \cdot d_{Tx} \leq TxMax \tag{15b}$$

Similarly, for the $Ty_{Min} < Ty$ and the $Ty < Ty_{Max}$ constraints, with $Ty_0$ still being set to zero:

$$TyMin \leq \lambda_{Txmin} \cdot d_{Ty} \leq TyMax \tag{15c}$$

$$TyMin \leq \lambda_{TxMax} \cdot d_{Ty} \leq TyMax \tag{15d}$$

Only those points are kept for further analysis that satisfy the constraints. As done in the following equations, Ti is calculated using each $\lambda$ that satisfies the above constraints imposed by the slab described in equations 4-6:

$$Ti_1 = Ti_0 + \lambda_1 d_{Ti} \tag{16a}$$

$$Ti_2 = Ti_0 + \lambda_2 d_{Ti} \tag{16b}$$

The above procedure is executed for intersection lines 1, 2, 3, and 4 formed by the pairs of $Tm_i$, $Tm_j$ constraint plane pairs, leading to a total of at most 8 Ti values. This procedure is carried out in block 216 of FIG. 2.

Figure 6:
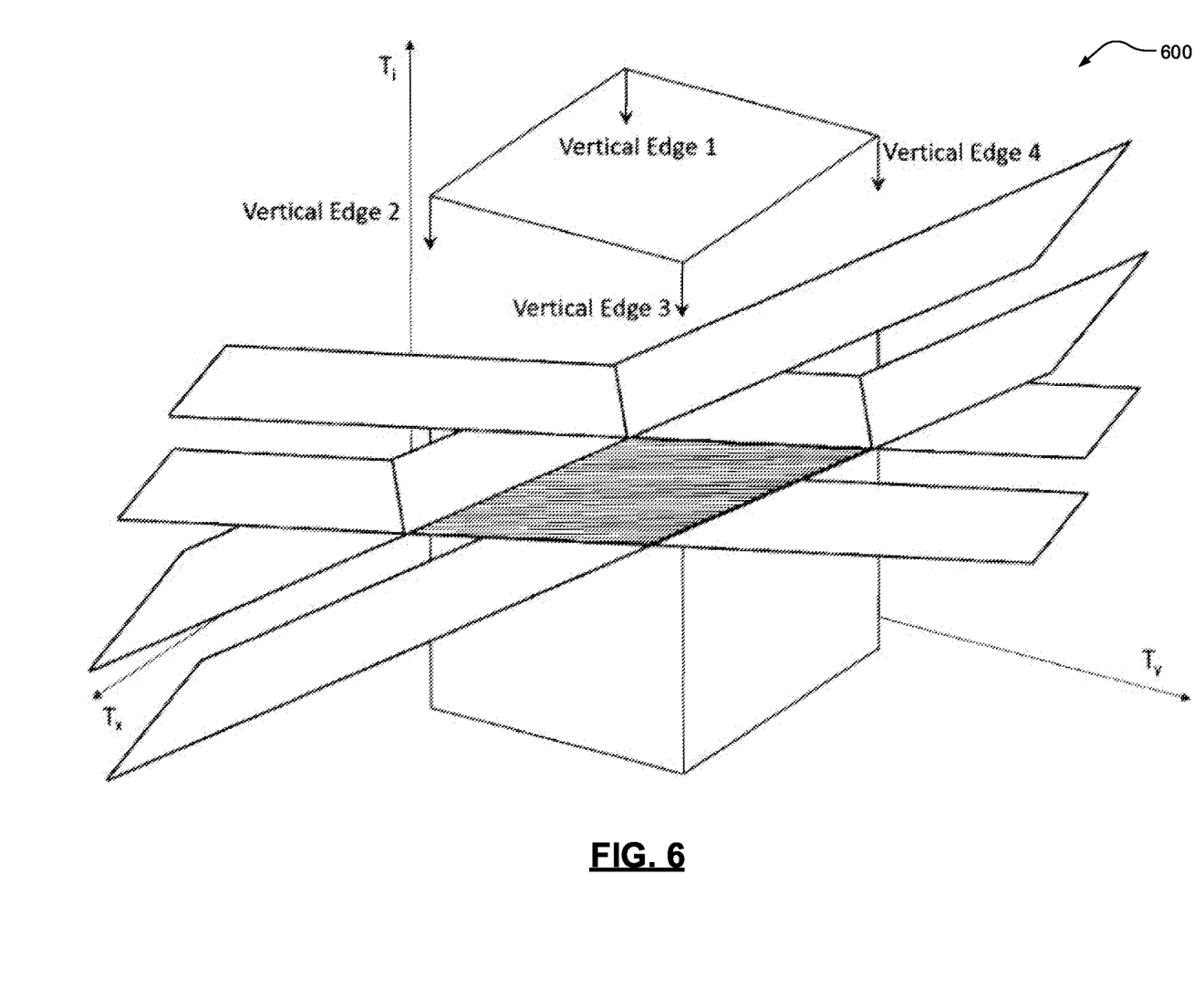
FIG. 6 is an example three-dimensional graph illustrating four vertical edges intersecting with at most four constraint planes according to the principles of the present application.

For the second type of intersection point, the points where the vertical edges of the slab intersect with the four constraint planes are located in block 220 of FIG. 2. The four edges of the Tx, Ty, Ti limit slab form the four contour lines that run parallel with the Ti axis and are defined as "vertical edges" and can be seen in FIG. 6. These four edges may each poke through some or all of the four constraint planes, leading to a total of at most 16 intersection points. For instance, "Vertical Edge 2" is at $Tx=Tx_{Max}$, $Ty=Ty_{Min}$. To obtain the intersection point of "Vertical Edge 2" with the $Tm_{j,max}$ plane, the coordinates: Tx=TxMax and Ty=TyMin are substituted into the equation of the $Tm_{j,max}$ plane. The equation of the $Tm_{j,max}$ plane is rearranged to calculate the Ti coordinate of the intersection point. After these points are determined, they are individually checked if they fall within the hatched overlap volume of the Tm and $Tm_1$ constraints, as shown in FIG. 4. Those points that do are kept for further processing. After finding these at most 8+16=24 points, the points with the minimum and maximum Ti values are selected in blocks 224 and 208 as described in greater detail below.

If the current TiMin is smaller than the previously stored TiMin, then this current TiMin is kept. Otherwise, the previously stored TiMin is kept. Similarly, if the current TiMax is larger than the previously stored TiMax, then the current TiMax is kept. Otherwise, we keep the previously stored TiMax. As described in greater detail below, this procedure is carried out for all possible combinations of two of the multiplicity of constraint plane pairs, and then the minimum and maximum Ti values are chosen from all the calculated values. This repetitive process runs around the feedback loop labeled "TiMin & TiMax from constraints" in FIG. 2.

Figure 7:
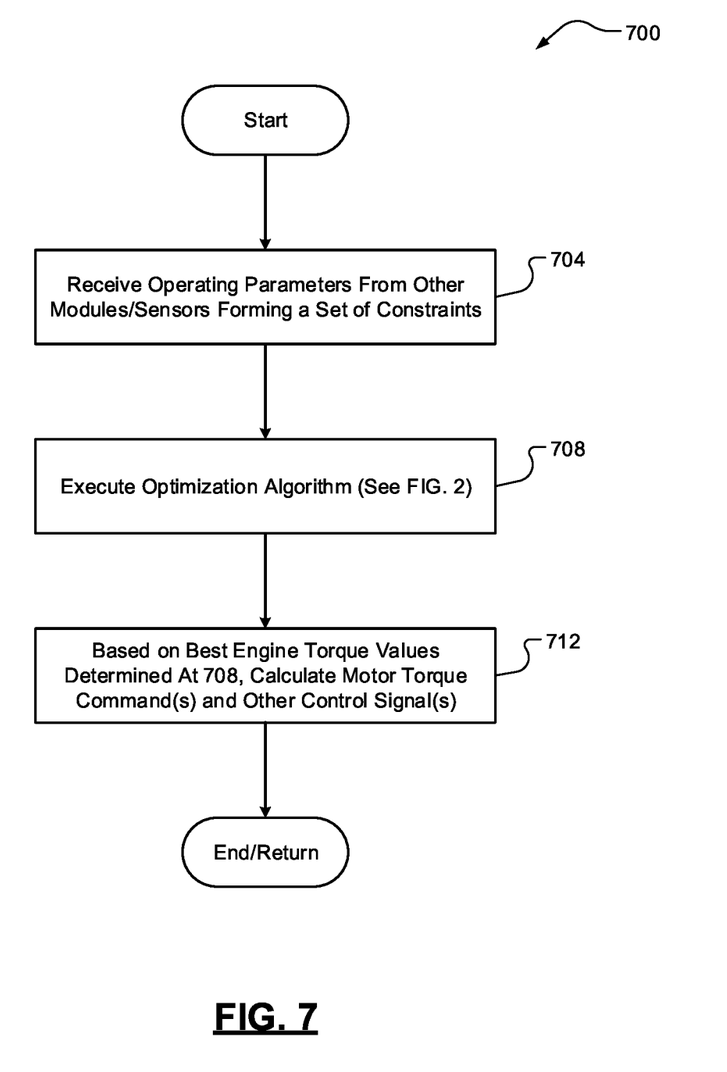
FIG. 7 is a flow diagram of an example method of determining minimum/maximum motor torque limits based on linear constraints according to the principles of the present application.

Referring now to FIG. 7, a flow diagram of an example method 700 of determining minimum and maximum engine torque limits based on three-dimensional constraints and controlling a hybrid-electric powertrain according to the principles of the present application is illustrated. While the components of the hybrid-electric powertrain 104 are specifically referenced for illustrative purposes, it will be appreciated that the method 700 could be applicable to other suitable hybrid-electric powertrain configurations. At 704, the controller 136 of the vehicle 100 and from a set of sensors 132 of the hybrid-electric powertrain 104, a set of operating parameters of a set of components of the hybrid-electric powertrain 104, wherein each component of the set of components may impose a constraint on the motor and engine torque levels for the electric motors 124*a*, 124*b* and engine 120. At 708, the algorithm shown in FIG. 2 is executed. At 712, the controller 136 accesses a three-dimensional graph including a slab representing various minimum/maximum motor torque limits for the engine 120 and the electric motors 124*a*, 124*b*. At 712, based on the engine torque limits determined at 708 are further processed and the torque command signals to the motors and the engine are sent out. At 712, the controller 136 controls the hybrid-electric powertrain 104 based on the final minimum and maximum engine torque values to avoid excessive torque commands that could damage physical components of the hybrid-electric powertrain and/or could cause undesirable noise/vibration/harshness (NVH) characteristics. The method 700 then ends or returns to 704 for one or more additional cycles.

It should also be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A control system for a hybrid-electric powertrain of a vehicle, the hybrid-electric powertrain including an internal combustion engine, two electric motors, a battery system, and a transmission comprising a plurality of clutches, the control system comprising:
    a set of sensors configured to measure a set of operating parameters of a set of components of the hybrid-electric powertrain, wherein each component of the set of components is a constraint on minimum/maximum motor torque limits, collectively defining a minimum/maximum motor torque limit slab, for the electric motors thereby collectively forming a set of constraints; and
    a controller configured to:
        perform a linear optimization to find best engine torque values that are attainable subject to a set of constraint inequalities as defined by current vehicle state and as monitored by the set of sensors; and
        control the hybrid-electric powertrain based on the best engine torque values to avoid excessive torque commands that could damage physical components of the hybrid-electric powertrain and/or could cause undesirable noise/vibration/harshness (NVH) characteristics,
    wherein the controller is configured to select two constraint plane pairs at a time and determine intersections between (i) the selected two constraint plane pairs and (ii) the minimum/maximum motor torque limits for all currently active constraint plane pair combinations and determine intersection points of two of the constraint plane pairs with the minimum/maximum motor torque limit slab, and then the best engine torque levels are chosen.

2. The control system of claim 1, wherein there are a plurality of constraints depending on a configuration of the hybrid-electric powertrain and operation mode.

3. The control system of claim 2, wherein the plurality of constraints includes at least two of engine torque, drive belt slip torque, torque of the electric motors, clutch and/or transmission gear states, and a state of the battery system.

4. The control system of claim 2, wherein the operation mode includes at least one of whether the engine participates in a series hybrid operating mode or a parallel hybrid operating mode, electric motor generator or motor mode, battery system depletion, charge sustaining, or recharging modes, clutch pack slippage, disengaged/open, or lock operation, dog clutch engaged or disengaged operation, and transmission gear selection.

5. The control system of claim 1, wherein the controller determines four intersection lines between the selected two pairs of constraint planes and then finds the intersection points of these lines with planes of the minimum/maximum motor torque limits with a three-dimensional geometric approach, and finds four vertical edges of the minimum/maximum motor torque limit slab and then finds the intersection points of two constraint plane pairs at a time with the four vertical edges leading to at most sixteen intersection points.

6. A method for controlling for a hybrid-electric powertrain of a vehicle, the hybrid-electric powertrain including an internal combustion engine, two electric motors, a battery system, and a transmission comprising a plurality of clutches, the method comprising:
- receiving, by a controller of the vehicle and from a set of sensors of the hybrid-electric powertrain, a set of operating parameters of a set of components of the hybrid-electric powertrain, wherein each component of the set of components is a constraint on minimum/maximum motor torque limits for the electric motors thereby collectively forming a set of constraints;
- performing, by the controller, a linear optimization to find best engine torque values that are attainable subject to a set of constraint inequalities as defined by current vehicle state and as monitored by the set of sensors; and
- controlling, by the controller, the hybrid-electric powertrain based on the best engine torque values to avoid excessive torque commands that could damage physical components of the hybrid-electric powertrain and/or could cause undesirable noise/vibration/harshness (NVH) characteristics,
- wherein the controller selects two constraint plane pairs at a time and determines intersections between (i) the selected two constraint plane pairs and (ii) the minimum/maximum motor torque limits for all currently active constraint plane pair combinations, and then the best engine torque levels are chosen.

7. The method of claim 6, wherein there are a plurality of constraints depending on a configuration of the hybrid-electric powertrain and operation mode.

8. The method of claim 7, wherein the plurality of constraints includes at least two of engine torque, drive belt slip torque, torque of the electric motors, clutch and/or transmission gear states, and a state of the battery system.

9. The method of claim 7, wherein the operation mode includes at least one of whether the engine participates in a series hybrid operating mode or a parallel hybrid operating mode, electric motor generator or motor mode, battery system depletion, charge sustaining, or recharging mode, clutch pack slippage, disengaged/open, or lock operation, dog clutch engaged or disengaged operation, and transmission gear selection.

10. The method of claim 6, wherein the controller first determines four intersection lines between the selected two constraint plane pairs of and then finds the intersection points of these lines with planes of the minimum/maximum motor torque limits with a three-dimensional geometric approach.

11. A method for controlling for a hybrid-electric powertrain of a vehicle, the hybrid-electric powertrain including an internal combustion engine, two electric motors, a battery system, and a transmission comprising a plurality of clutches, the method comprising:
- receiving, by a controller of the vehicle and from a set of sensors of the hybrid-electric powertrain, a set of operating parameters of a set of components of the hybrid-electric powertrain, wherein each component of the set of components is a constraint on minimum/maximum motor torque limits, collectively defining a minimum/maximum motor torque limit slab, for the electric motors thereby collectively forming a set of constraints;
- performing, by the controller, a linear optimization to find best engine torque values that are attainable subject to a set of constraint inequalities as defined by current vehicle state and as monitored by the set of sensors; and
- controlling, by the controller, the hybrid-electric powertrain based on the best engine torque values to avoid excessive torque commands that could damage physical components of the hybrid-electric powertrain and/or could cause undesirable noise/vibration/harshness (NVH) characteristics,
- wherein the controller determines intersection points of two constraint plane pairs with the minimum/maximum motor torque limit slab, and then the best engine torque levels are chosen.

12. The method of claim 11, wherein there are a plurality of constraints depending on a configuration of the hybrid-electric powertrain and operation mode.

13. The method of claim 12, wherein the plurality of constraints includes at least two of engine torque, drive belt slip torque, torque of the electric motors, clutch and/or transmission gear states, and a state of the battery system.

14. The method of claim 12, wherein the operation mode includes at least one of whether the engine participates in a series hybrid operating mode or a parallel hybrid operating mode, electric motor generator or motor mode, battery system depletion, charge sustaining, or recharging mode, clutch pack slippage, disengaged/open, or lock operation, dog clutch engaged or disengaged operation, and transmission gear selection.

15. The method of claim 11, wherein the controller first finds four vertical edges of the minimum/maximum motor torque limit slab and then finds the intersection points of a select two constraint plane pairs at a time with the four vertical edges leading to at most sixteen intersection points.

* * * * *